(12) United States Patent
Griffin et al.

(10) Patent No.: US 10,878,123 B2
(45) Date of Patent: Dec. 29, 2020

(54) APPLICATION APPROVAL

(71) Applicant: Hewlett-Packard Development Company, L.P., Houston, TX (US)

(72) Inventors: Jonathan Griffin, Bristol (GB); Adrian J. Baldwin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 178 days.

(21) Appl. No.: 16/072,149

(22) PCT Filed: Apr. 10, 2016

(86) PCT No.: PCT/US2016/026890
§ 371 (c)(1),
(2) Date: Jul. 23, 2018

(87) PCT Pub. No.: WO2017/180089
PCT Pub. Date: Oct. 19, 2017

(65) Prior Publication Data
US 2019/0034659 A1    Jan. 31, 2019

(51) Int. Cl.
*G06F 21/62* (2013.01)
*G06F 21/57* (2013.01)
(Continued)

(52) U.S. Cl.
CPC .......... *G06F 21/6245* (2013.01); *G06F 21/57* (2013.01); *G06F 21/577* (2013.01);
(Continued)

(58) Field of Classification Search
CPC .... G06F 21/6245; G06F 21/57; G06F 21/629; G06F 21/604; G06F 21/577; H04W 12/0027; H04W 12/0023; H04W 12/10
See application file for complete search history.

(56) References Cited

U.S. PATENT DOCUMENTS 8,725,585 B1    5/2014  Kay et al.
2006/0136419 A1  6/2006  Brydon et al.
(Continued)

FOREIGN PATENT DOCUMENTS

CN    101681252    3/2010
JP    2012252471   12/2012
(Continued)

OTHER PUBLICATIONS

Kawabata, Taichi et al., "Proposal of System to Support a User to Judge Whether Personal Data can be Provided", 2013 Proceedings of the IEICE general conference, Communication Society 2, The IEICE, Mar. 5, 2013, p. 595.
(Continued)

*Primary Examiner* — Joseph P Hirl
*Assistant Examiner* — Thomas A Gyorfi
(74) *Attorney, Agent, or Firm* — HP Inc. Patent Department

(57) ABSTRACT

Examples associated with application approval are described. One example includes receiving an application package. The application package contains an application from a service provider and a privacy description for the application from a review provider. The application operates on private data controlled by a user. The application package is validated to ensure components of the application package is properly credentialed. An application summary for the user is generated from the privacy description. The application summary describes what portions of private data will be accessed by the application and how portions of the private data will be transmitted. An authorization is received from the user, and execution of the application is controlled based on the authorization of the user.

20 Claims, 7 Drawing Sheets

(51) Int. Cl.
*G06F 21/60* (2013.01)
*H04W 12/00* (2009.01)
*H04W 12/10* (2009.01)

(52) U.S. Cl.
CPC .......... *G06F 21/604* (2013.01); *G06F 21/629* (2013.01); *H04W 12/0023* (2019.01); *H04W 12/0027* (2019.01); *H04W 12/10* (2013.01)

(56) References Cited

U.S. PATENT DOCUMENTS

| | | | |
|---|---|---|---|
| 2009/0013413 A1* | 1/2009 | Vera | H04L 63/102 |
| | | | 726/30 |
| 2012/0166620 A1 | 6/2012 | Said et al. | |
| 2012/0222083 A1* | 8/2012 | Vaha-Sipila | H04L 63/102 |
| | | | 726/1 |
| 2013/0185804 A1* | 7/2013 | Biswas | G06F 21/577 |
| | | | 726/26 |
| 2013/0247030 A1* | 9/2013 | Kay | H04L 67/34 |
| | | | 717/178 |
| 2013/0283400 A1* | 10/2013 | Schneider | G06F 21/572 |
| | | | 726/30 |
| 2013/0318095 A1 | 11/2013 | Harold | |
| 2014/0095390 A1 | 4/2014 | Lei et al. | |
| 2014/0258555 A1 | 9/2014 | Meredith et al. | |
| 2015/0180875 A1 | 6/2015 | Kay | |
| 2015/0312263 A1 | 10/2015 | Bhamidipati et al. | |
| 2016/0026354 A1 | 1/2016 | Mcintosh et al. | |
| 2016/0099963 A1* | 4/2016 | Mahaffey | H04L 63/0227 |
| | | | 726/25 |

FOREIGN PATENT DOCUMENTS

| | | |
|---|---|---|
| JP | 2013228814 | 11/2013 |
| WO | WO-02077844 A1 | 10/2002 |
| WO | WO-2007142716 A2 | 12/2007 |

OTHER PUBLICATIONS

Takemori, Keisuke et al., "Third party review framework for privacy policy of application/contents", IPSJ SIG Technical Reports (SPT) 2013-SPT-006 [online], Japan, Information Processing Society of Japan (IPSJ), Jul. 11, 2013, vol. 62, p. 1-p. 8.

Laher, TJ."The Business Value of Pervasive Analytics"; Nov. 14, 2014; http://www.datasciencecentral.com/profiles/blogs/the-business-value-of-pervasive-analytics.

* cited by examiner

_US 10,878,123 B2_

APPLICATION APPROVAL

BACKGROUND

One modern technology trend is movement towards an internet of things, which is vastly expanding the number and types of devices that will be communicating with one another to perform useful functions. These devices may include devices that are conventionally network connected (e.g., computers, mobile devices), sensors (e.g., thermometers, barometers), as well as other devices ranging from household appliances and components (e.g., refrigerator, thermostat), to manufacturing machinery, scientific research equipment, wearables, vehicles, and so forth. In some examples, the devices may perform a variety of data gathering functions that store data at a location controlled by a user. In other examples, data may be gathered by devices and stored by the device vendor. That vender may then perform further processing.

BRIEF DESCRIPTION OF THE DRAWINGS

The present application may be more fully appreciated in connection with the following detailed description taken in conjunction with the accompanying drawings.

DETAILED DESCRIPTION

Figure 1:
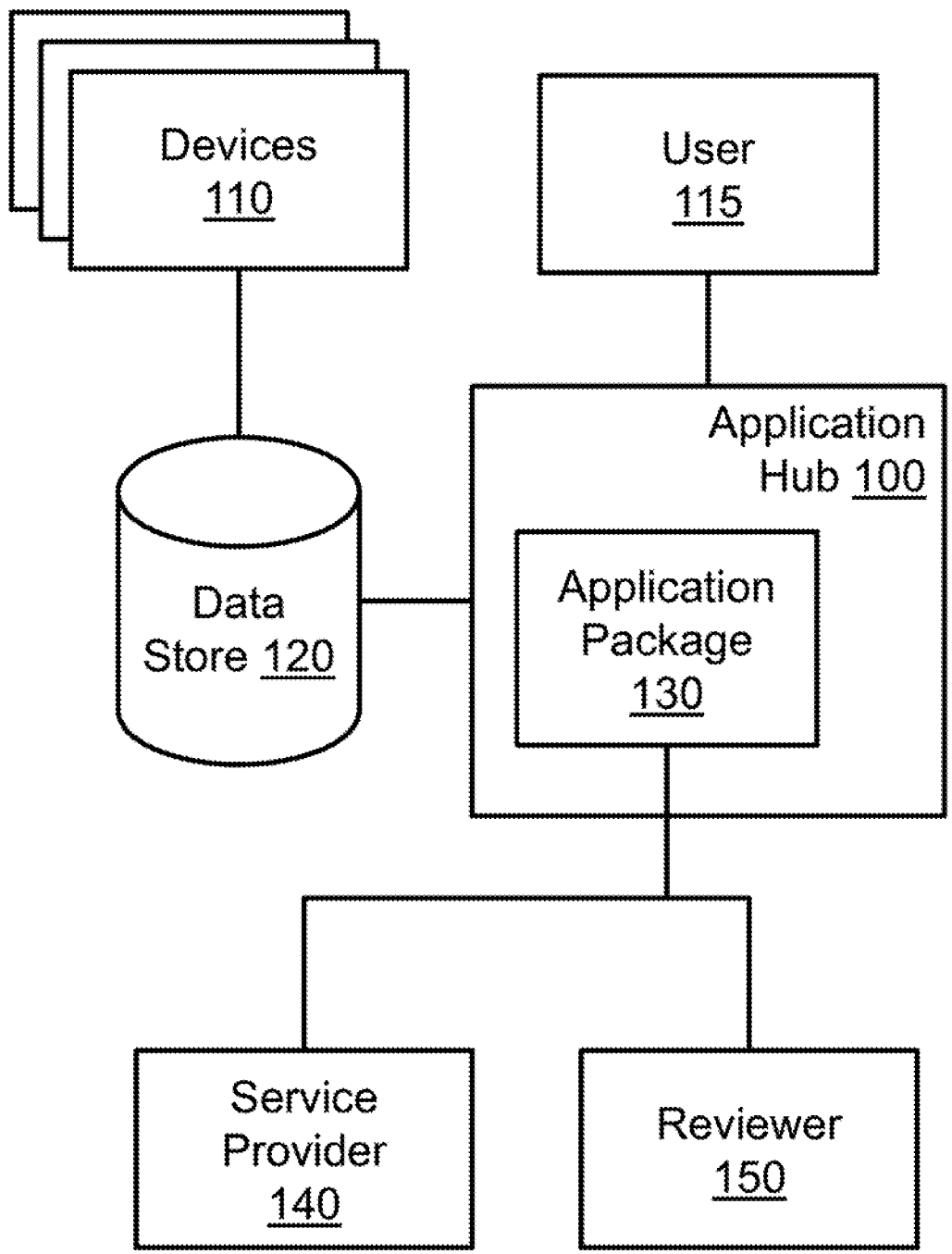
FIG. 1 illustrates an example application hub associated with application approval.

Systems, methods, and equivalents associated with application approval are described. A user may operate a variety of devices that perform a variety of functions for the user. These devices may include, for example, wearables, sensors, appliances, and so forth that help the user go about their day to day tasks, provide information to the user, and so forth. Some of these devices may collect data for the user. For example, a fitness wearable may store health data including step count, heart rate, activity levels, and so forth throughout the day of the user. This data may be stored in a data store controlled by the user or in a data store controlled by a vendor of the fitness wearable, allowing the vendor to perform data analysis and/or provide further services for the user. The user may find this solution undesirable if the user is concerned with sharing personal data with the vendor, despite potentially valuing the additional data analysis and services.

In examples where device data is stored in a data store controlled by a user, other devices operated by the user may also store data in the same data store, or in other data stores controlled by the user. In these examples, the maker of the fitness wearable may seek to provide additional features, information, and/or analysis for the user that requires accessing the data from the fitness wearable in the user's data store. However, if the user is concerned with the privacy of their data, they may seek a solution that allows them to preview how data will be accessed and transmitted before granting access to data in the data store.

Consequently, the maker of the fitness wearable may design an application that the user can run that will access the user's data and provide information based on the data to, for example, the user, the service provider, a third party, and so forth. To ensure privacy of the data is guaranteed to a level desired by the user, the service provider may have the application reviewed by an application review that will create an application review. The application reviewer may identify what data from the user's data store will be accessed by the application, as well as whether and/or how that data will be transmitted to destinations outside the control of the user. The application and the review may be combined to create an application package provided to the user. The application package may be received by an application hub on a device controlled by the user. The application hub may then provide portions of the application review to the user so the user can make an informed decision about whether to authorize execution of the application. If the user does approve executing the application, the application hub may control execution of the application, data access in the data store, and other functions relating to the operation of the application over the life cycle of the application.

Consequently, systems and methods described herein may allow a user to maintain their own data without releasing the data to third parties unless based on an informed decision by the user. The users may be able to download apps to analyze and/or visualize their own data, or provide results of analysis to service provider who may then provide information or a service to the user. Effectively, an application may execute on a user controlled hub (whether on a user device or provided within cloud service) without necessarily providing the distributer of the application access to the user's raw data.

FIG. 1 illustrates an example application hub 100 associated with application approval. It should be appreciated that the items depicted in FIG. 1 are illustrative examples, and many different systems, devices, and so forth, may operate in accordance with various examples.

FIG. 1 illustrates an example application hub 100 associated with application approval. Application hub 100 may be responsible for various aspects of life cycle management of applications seeking access to data in data store 120. Data store 120 may contain data received from a variety of devices 110. The devices 110 may be controlled in various aspects by user 115. The devices 110 may, for example, perform functions for user 115, record data for user 115, and so forth. By way of illustration, the devices 110 may include fitness wearables that track health information for user 115, location trackers that track the GPS location of user 115, temperature sensors around user 115's home so user 115 can more efficiently heat their home, and so forth. Devices 110 may also include personal computers, mobile devices, networked appliances operated by user 115. Devices 110 may also relate to industrial, manufacturing or scientific purposes and store data related to these purposes in data store 120. Though data store 120 is illustrated in this example as being external to application hub 100, in other examples, data store 120 may be a component of application hub 100.

As mentioned above, data recorded by devices 110 may be stored in data store 120 for analysis and/or later retrieval by user 115. This analysis and retrieval may be performed by a variety of applications that run with the authorization of user 115. In various examples, data store 120 may be a storage device (e.g., hard disc, external storage) coupled to a device physically controlled by user 115. In other examples, data store 120 may be a cloud storage solution employed by user 115. Similarly, application hub 100 may operate on a device physically controlled by user 115 (e.g., personal computer, mobile device) and/or collocated with data store 120, or as a cloud solution provided to user 115 that operates remotely from one or more of user 115, data store 120, and so forth.

The life cycle of an application may begin when an application package 130 containing the application is obtained by application hub 100. In various examples, application package 130 may be obtained in a response to an action taken by user 115. By way of illustration, user 115 may initiate the download of application package 130 by clicking a hyperlink in a webpage. In other examples, application hub 100 may also serve as an application store through which user 115 can browse a variety of applications that user 115 may be interested in downloading. In other examples, application package 130 may be obtained automatically by application hub 100 under certain circumstances. By way of illustration, application hub 100 may be configured to obtain application package 130 in response to detecting a specific type, of data in data store 120, connection of application hub 100 and/or data store 120 to a specific device 110, a user action, and so forth.

Application package 130 may contain several components. For example, application package 130 may contain an application. The application may originate from a service provider 140. Application package 130 may also contain a review of the application. The review of the application may originate from a reviewer 150. In various examples, application package 130 may be assembled by, for example, service provider 140, reviewer 150, application hub 100, another entity, and so forth. In other examples, application package 130 may not be assembled within application hub 100 at a single time. By way of illustration, application hub 100 may first obtain the review of the application, perform various functions further described below in association from the review, and then, upon completing those actions, obtain the application and perform appropriate functions in association with the application.

As mentioned above, service provider 140 may be the source of the application obtained by application hub 100. The application itself may access data in data store 120. How that data is used by the application may depend on the role of service provider 140. For example, service provider 140 may be interested in the contents of the data in data store 120 itself. In other examples, service provider 140 may have a relationship with one or more devices 110 providing data to data store 120 (e.g., a fitness wearer device manufacturer). In other examples, service provider 140 may provide a service to user 115 that makes use of some of the data in data store 120. Other relationships between service provider 140, the application, and other entities illustrated in FIG. 1 may also exist, and combinations of relationships may also be possible.

Reviewer 150 may operate as a trusted third party that seeks to help user 115 make informed decisions about what applications are running on data in data store 120. Consequently, prior to service provider 140 providing the application to application hub 100, service provider 140 may provide the application to reviewer 150. Reviewer 150 may then perform a series of diagnostics running on a test environment to identify data used by the application, how that data is used, and what information is transmitted by the application to service provider 140, third parties, and so forth.

Consequently, reviewer 150 may serve as a trusted third party for both service provider 140 and for user 115. For service provider 140, reviewer 150 may have access to the source code of the application so that reviewer 150 can ensure that the application does not perform actions beyond what service provider 140 claims. Agreements between reviewer 150 and service provider 140 may prevent undesired disclosure of the source code of the application, giving protections to service provider 140. For user 115, reviewer 150 may be trusted to generate accurate reports about how applications obtained by application hub 100 operate. In addition to information about data access and transmission by applications, application reviews may also describe, for example, resource usage of applications, identities of service provider 140 and/or data recipients, and so forth. Consequently, the reviews may provide user 115 valuable information that allows user 115 to make an informed decision about whether to run applications based on their privacy preferences regarding the data in data store 120. Reviewer 150 may also be responsible for taking part in digitally signing various components of application package 130 to prevent undesirable replacement of the components of application package 130 by, for example, service provider 140, a malicious third party, and so forth.

After receiving application package 130, or the relevant portions thereof, application hub 100 may begin the process of presenting relevant information from application package 130 to user 115 so that approval to run the application may be obtained from user 115. First, application hub 100 may perform various validation functions on components of application package 130. These verification functions may include, for example, verifying digital signatures of service provider 140, reviewer 150, and so forth. In various examples reviewer 150 may digitally sign the application, the review provided by reviewer 150, the entire application package 130, and so forth. Verifying the digital signatures may ensure that purported sources of the components of application package 130 are who they say they are. However, techniques other than digital signatures may be used for validation of sources of components of application package 130 may also be, employed.

Application hub 100 may then begin formatting information from application package 130 for provision to user 115. In various examples, information in application package 130 may be delivered in a manner that is already prepared for provision to user 115. By way of illustration the review received from reviewer 150 may be formatted as HTML code or a text document that can be delivered directly to user 115. In other examples, the review 150 may be formatted in a manner that controls application hub 100 to perform various functions in association with executing the application. Consequently, review 150 may have code components that are translated by application hub 100 into a description readable by user 115. This description may identify a variety of attributes of the application.

In various examples, the description of the application may convey information to user 115 regarding what data from data store 120 the application associated with application package 130 will access, how that data will be used by the application, what information will be transmitted by the application to destinations outside the control of user 115. What data from data store 120 the application will access may indicate, for example, devices 110 from which data in data store 120 is obtained, known formats and sources of data that may exist in data store 120, and so forth. How data will be used may describe what mathematical functions will be used to manipulate data from data store 120. What data will be transmitted may indicate whether selected raw data fields will be transmitted, whether aggregated data will be transmitted, and so forth. The description may also indicate who information will be transmitted to by the application. The description of the application may also identify to user 115, for example, resource consumption of the application, when the application will run, and so forth. The description may also convey, for example, a benefit to the user for running the application, how to remove or revoke execution permission for the application, when and how often the application will run, resources used by the application, identities of service provider 140, reviewer 150, or interested third parties, whether data transmitted may be subsequently sold to, for example, advertisers and so forth.

After reviewing the description, user 115 may make a decision about whether the application should be permitted to run on data from data store 120. The decision may be made based on reviewing the description provided by the application hub 100. User 115 may make this decision based on their personal privacy preferences for the data the description says the application will access, value the user will obtain from sharing the data (e.g., analysis results, rewards, additional device functionality). By way of illustration, a user may have lower personal privacy preferences for temperature data gathered by a thermometer outside their home, than their health information recorded by a fitness wearable. The decision may also be stored in application hub 100. If the decision does not authorize execution of the application, application hub 100 may remove components of application package 130 to free up resources of a system or device on which application hub 100 is operating. When user 115 does authorize the application to execute, application hub 100 may proceed to schedule execution of the application.

In various examples application hub 100 may take a variety of roles when controlling execution of the application. In some examples, application hub 100 may merely perform some basic tasks to ensure proper installation of the application once user 115 has approved execution of the application. In other examples, application hub 100 may be responsible for managing scheduling when applications are operating. In other examples, application hub 100 may be designed to ensure, based on the review of the application from reviewer 150, that the application cannot violate certain aspects of the review. For example, if the review of the application says that the application will only access specific portions of data store 120, application hub 100 may enforce these access guidelines by, for example, limiting responses from data store 120 to those from the specific portions of data store 120. In other examples, application hub 100 may prevent the application from executing queries that will return data from portions of data store 120 outside the specific portions of data store 120, Similarly, application hub 100 may be able to prevent the application from transmitting data to parties outside those specifically identified in the application review.

In addition to enforcement of application actions based on the review, application hub 100 may enforce application actions based on user permissions. By way of illustration, when granting the application permission to run on data store 120, user 115 may seek to specify various permissions regarding when and how the application is allowed to execute. These permissions may include, for example, when the application is allowed to execute, how many times the application is allowed to execute, resource limitations for executing the application, data in data store 120 that the application is or is not allowed to access, and so forth. In some examples, options for user permissions may be limited based on review of the application and/or the description of the application. For example, a service provider may indicate that data should be processed once a day, but allow a user to select when during the day the data is processed (e.g., to allow the user to manage processing resources).

Application hub 100 may also handle application updates for the application. In various examples, updates to applications may be instructions that cause changes to the application already stored within application hub 100, data files that change how the application operates, or replacement executables that replace the application outright. In some examples, reviewer 150 may also provide update reviews for updates to applications provided by service provider 140. The update reviews may describe changes to the application that will result from running the update to the application. In some examples, user authorization may be requested whenever an application is updated. In other examples, user authorization may be requested when the application is changed in a manner that exceeds a threshold. The threshold may be, for example, set by user 115, set by reviewer 150, set by a distributer of application hub 100, and so forth. The threshold may relate to, for example, functionality added to or removed from the application by the update, whether new data in data store 120 is accessed as a result of the update, whether the update relates to improving efficiency and/or bug fixes for the application, and so forth. Reviewer 150, in a description of the update, may indicate how significantly the update will affect the execution of the application.

Application hub 100 may also transmit various assurances to service provider 140, reviewer 150, a distributer of application hub 100, interested third parties, and so forth. These assurances may relate to, for example, version information associated with application hub 100, information associated with a device on which application hub 100 is operating, and so forth. In one example, these assurances may include a trusted boot record created using a TCG protocol to provide a root of trust that assure application hub 100 is operating as expected. The assurances may allow, for example, service provider 140 to know that applications running on application hub 100 are secure (e.g., applications will run as requested and be given access to requested data). Other assurances may relate to, for example, processing resources available to application hub 100, and so forth.

In some example, data store 120 may store data managed by multiple users 115 that control distinct or overlapping sets of devices 110 (e.g., family members within a household). In these examples, application hub 100 may perform various access control functions that allows switching between users 115. These access control functions may allow one user to grant access to a certain type of data in data store 120, but another user to prevent, access to their data of the same type. In cases where applications provide enhanced functionality when data from multiple users grant access data in data store 120, application hub 100 may facilitate successful operation of these features.

To encourage users 115 to install and run applications, service providers 140, reviewer 150, a distributer of application hub 100, and so forth may provide a variety of incentives to the users 115. These incentives may, for example, provide discounts or benefits to users 115, enable functionalities of devices 110, and so forth. In various aspects, application hub 100 may be responsible for managing some of these incentives. By way of illustration, application hub 100 may record, transmit, or otherwise handle when user 115 has earned an incentive. In other examples, application hub 100 may control a device 110 to perform a function associated with an incentive. A service provider 140, an application, or another entity may also be involved with facilitating receipt of the incentive by user 115.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
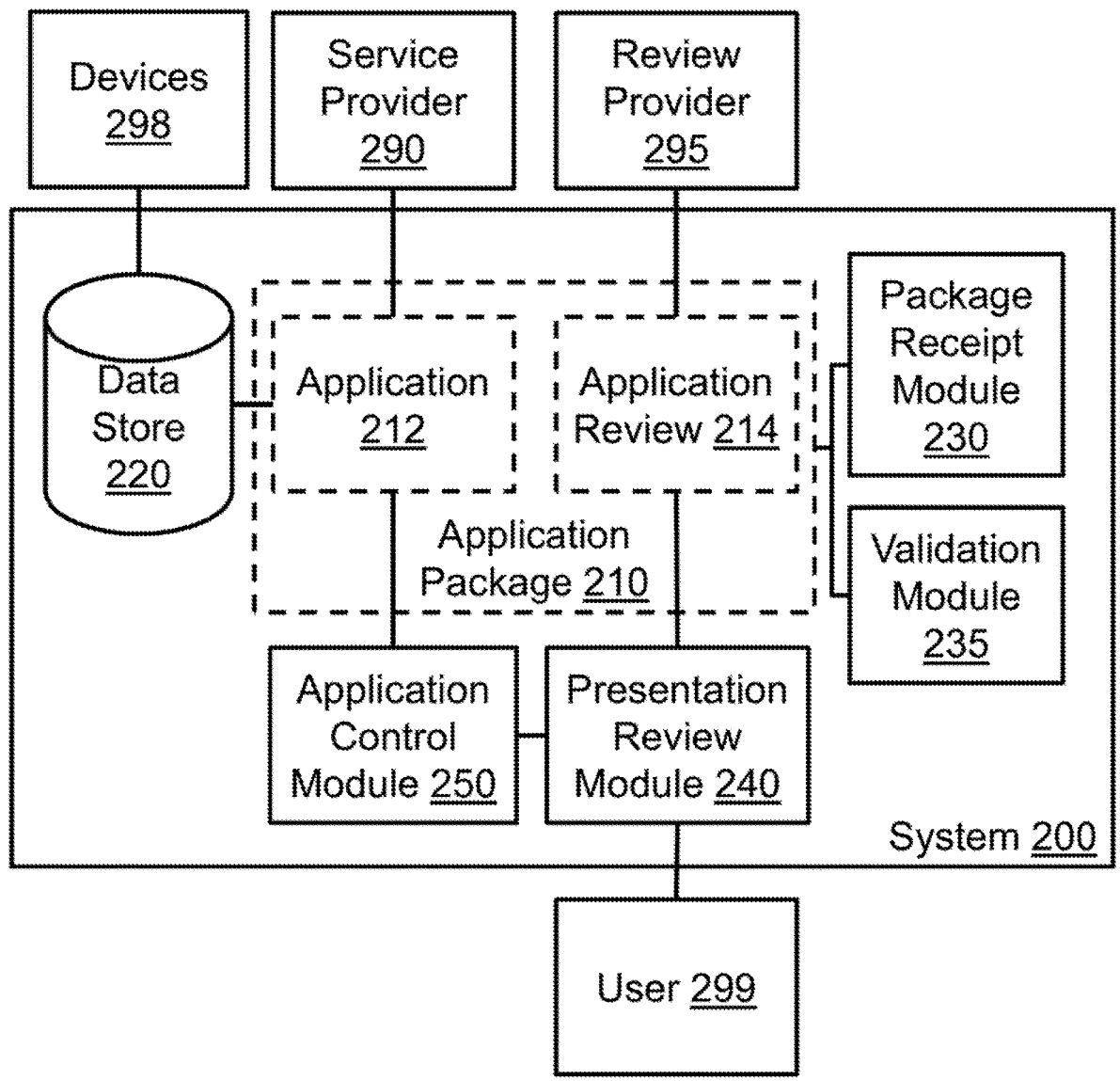
FIG. 2 illustrates example system associated with application approval.

FIG. 2 illustrates an example system 200 associated with application approval. System 200 includes a data store 220. Data store 220 may store data aggregated from a set of devices 298. Members of the set of devices 298 may be managed by a user 299. In some examples, data store 220 may store data aggregated from sets of devices 298 maintained by multiple users 299.

In various examples, system 200 may so operate on a device 298 controlled by user 299. Consequently, the device operating system 200 may be, for example, a personal computer, a work computer, a virtual machine, a mobile device (e.g., cellular phone, tablet), and so forth. In other examples, system 200 may operate as a service in a cloud solution provided to user 299. The cloud service may, for example, store data received from devices 298 in data store 220, and allow user 299 to provide access to the data via applications 212 that may run on data in data store 220.

System 200 also includes a package receipt module 230. Package receipt module may receive an application package 210. Application package 210 may include an application 212. Application 212 may be provided by a service provider 290. Application package 210 may also include an application review 214. Application review 214 may be provided by review provider 295. Application package 210 may also include, for example, a description of a benefit to user 299 for running application 212, a description of how to withdraw approval of execution of application 212, a description of data from data store 220 that will be transmitted by application 212, a description of how data from data store 220 transmitted by application 212, a description of how data transmitted by application 212 will be used by recipients of the data, a description of who will receive data from data store 220 transmitted by application 212, a timetable describing when application 212 will run, a description of resource consumption by application 212, an identity of service provider 290, a digital signature of service provider 290, a digital signature of review provider 295, and so forth.

In various examples package receipt module 230 may receive application package 210 from service provider 290, from review provider 295, from an application store (not illustrated), and so forth. In other examples different portions of application package 210 may be received from different sources. By way of illustration, application 212 may be received from service provider 290, application review 214 may be received from review provider 295, and other components of application 210 may be received from their respective origins as appropriate.

System 200 also includes a validation module 235. Validation module 235 may ensure contents of application package 210 are properly credentialed. In some examples, validation module 235 may ensure contents of application package 210 are properly credentialed based on digital signatures associated with the contents of application package 210. The digital signatures may be provided by one or more of service provider 290, review provider 295, third parties (e.g., certificate authorities), and so forth. Other validation techniques (e.g., public-private key cryptography) may also be used to ensure contents of application package 210 are properly credentialed (e.g., dates during which portions of application package 210 are valid, online checks to ensure portions of application package 210 have not been updated and that reviews are not revoked).

System 200 also includes a review presentation module 240. Review presentation module 240 may provide a description of application 212 to user 299. The description of application 212 may be generated from the review 214 of the application 214. The description of application 212 may identify data from data store 220 that will be affected by running application 212. In various examples, the description of application 212 may state which data from data store 220 will be accessed by application 212, which data from data store 220 will be modified by application 212, which data will be transmitted by application 212, which data will be used as a basis for statistics transmitted by application 212 to third parties (e.g., service provider 290), and so forth.

System 200 also includes an application control module 250. Application control module 250 may control execution of application 212 when user 299 approves execution of application 212. Controlling execution of application 212 may include, for example, ensuring proper installation of application 212, initiating application 212 at certain planned times, and so forth. By way of illustration, controlling execution of multiple applications 212 may involve scheduling, based on requirements regarding when and/or how often the applications 212 should run, processing requirements, and so forth. Based on the scheduling, application control module 250 may initiate applications at various times, manage available resources during those times, and so forth.

Figure 3:
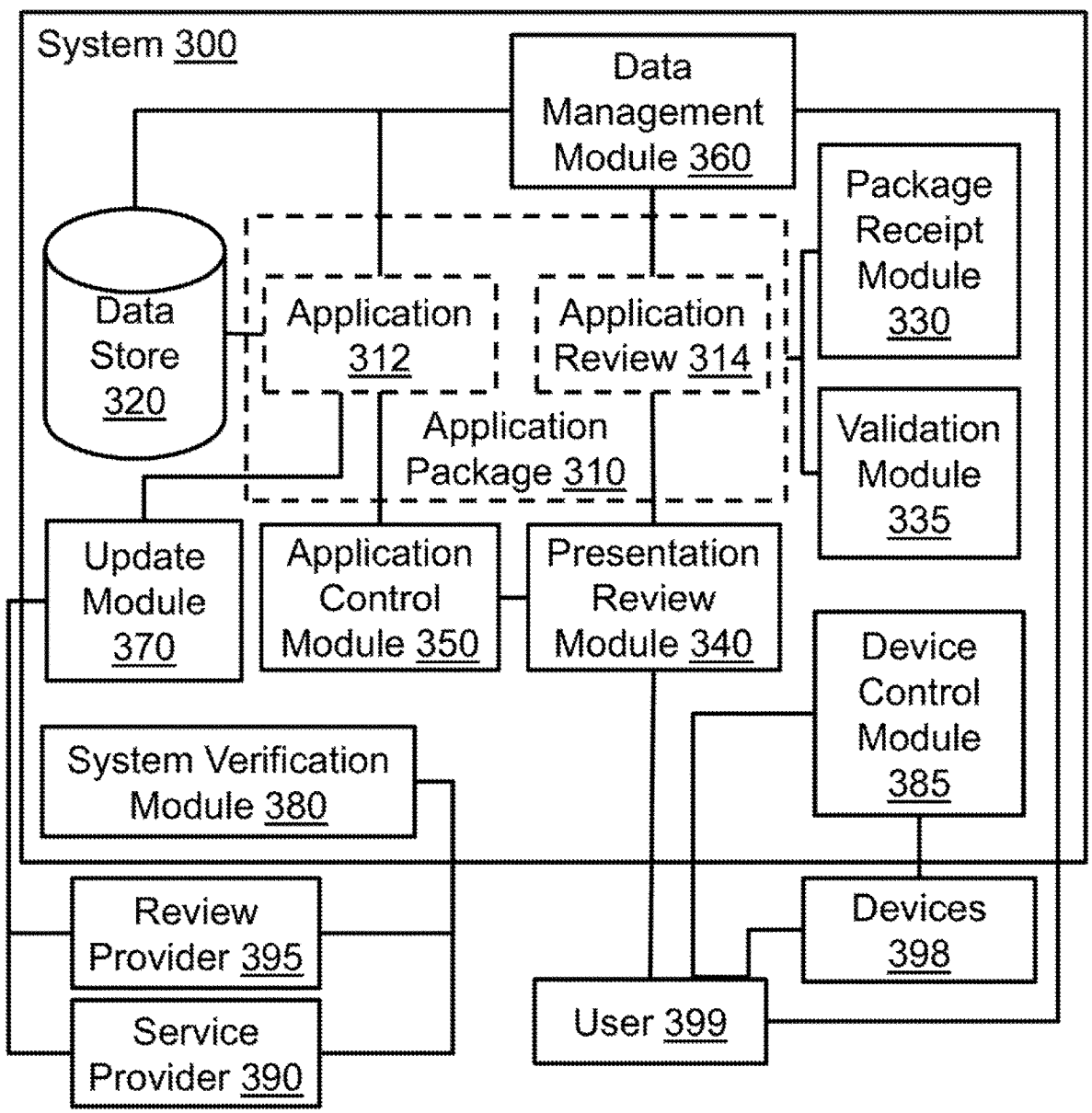
FIG. 3 illustrates another example system associated with application approval.

FIG. 3 illustrates an example system 300 associated with application approval. System 300 includes many items similar to those described above with reference to system 200 (FIG. 2). For example, system 300 includes a data store 320 to store data from a set of devices 398 managed by a user 399, a package receipt module 330 to obtain an application package 310 containing an application 312 from a service provider 390 and a review 314 of application 312 from a review provider 395. System 300 also includes a validation module 335, a presentation review module 340, and an application control module 350.

System 300 also includes a data management module 360. Data management module 360 may control access to data in data store 320 by application 312. Access to the data in data store 320 may be controlled based on the review 314 of application 312 from application package 310. By way of illustration, if the review 314 of application 312 indicates that application 312 will access data in data store 320 associated with a specific device 398, data management module 360 may prevent application 312 from accessing data associated with other devices 398 stored in data store 320. Data management module 360 may perform access control by, for example, prohibiting queries that exceed a scope described in the review 314 of application 312, limiting query responses to data within a scope described in the review 314 of application 312, and so forth. In other examples, data management module 360 may control access to data in data store 320 based on a statement from service provider 390 that is verified by review provider 395 in the review 314 of application 312.

In some examples, data management module 360 may provide user 399 an interface to specify data from data store 320 that application 312 is allowed to access. In these examples, data management module 360 may control access to data in data store 320 by application 312 based on the data specified by user 399. Similarly, application control module 350 may provide user 399 an interface that allows user 399 to control other attributes of the execution of the application 312 (e.g., timing, resource usage). How much control user 399 is given over the other attributes may depend on application specifications (e.g., processing requirements) dictated by, for example, the review 314 of application 312.

System 300 also includes an update module 370. Update module 370 may receive an update package (not shown) for application 312. The update package may include update instructions for application 312 from service provider 390. In various examples, the update instructions may be, a replacement application, updated modules and/or data for application 312, instructions that when executed cause changes to application 312, and so forth. The update package may also include a description of the update instructions from review provider 395. In some examples, update module 370 may prevent execution of the update instructions without an authorization from user 399. This may be desirable to prevent an update from accessing new data in data store 320 without user 399's permission. In other examples, updates to application 312 may be minor changes (e.g., bug fixes, performance improvements) that do not change the functionality that do not modify the functionality of application 312 and/or the data in data store 320 accessed by application 312. These updates may be permitted by update module 370 for execution without review by user 399. In some examples, whether execution approval is sought from user 399 by update module 370 may depend on whether changes to application 312 cause by the update instructions exceed a specified threshold. The threshold may be set by, for example, a distributer of system 300, user 399, review provider 395, service provider 390, and so forth.

System 300 also includes a system verification module 380. System verification module may provide information regarding a state of system 300 to at least one of review provider 395 and service provider 390. The information regarding the state of system 300 may relate to a device on which system 300 is operating, a version of system 300, security of system 300, security of a device on which system 300 is operating, and so forth. In some examples, verification module 380 may also verify that resources are available to run application 312. This may be desirable when, for example, system 300 or components thereof operate as a cloud service to user 399, and the cloud service provides fixed or otherwise limited resources to user 399 for executing queries on data store 320. Similarly, verifying availability of resources may be desirable when user 399 is running multiple applications 312 of different data sets that each use varying resources. Thus, in this example, system verification module 380 may ensure system 300 has sufficient resources for the app to run within a given time window considering other applications that are also scheduled during that time window.

System 300 also includes a device control module 385. Device control module 385 may control a member of the set of devices 398 to perform an action. The action may be controlled in response to, for example, an instruction from application 312, an instruction from service provider 390, an instruction from review provider 390, an instruction from application package 310, and so forth. In various examples, the action may cause a device 398 to activate a previous inactive functionality, reward user 399 for executing application 312, and so forth.

Figure 4:
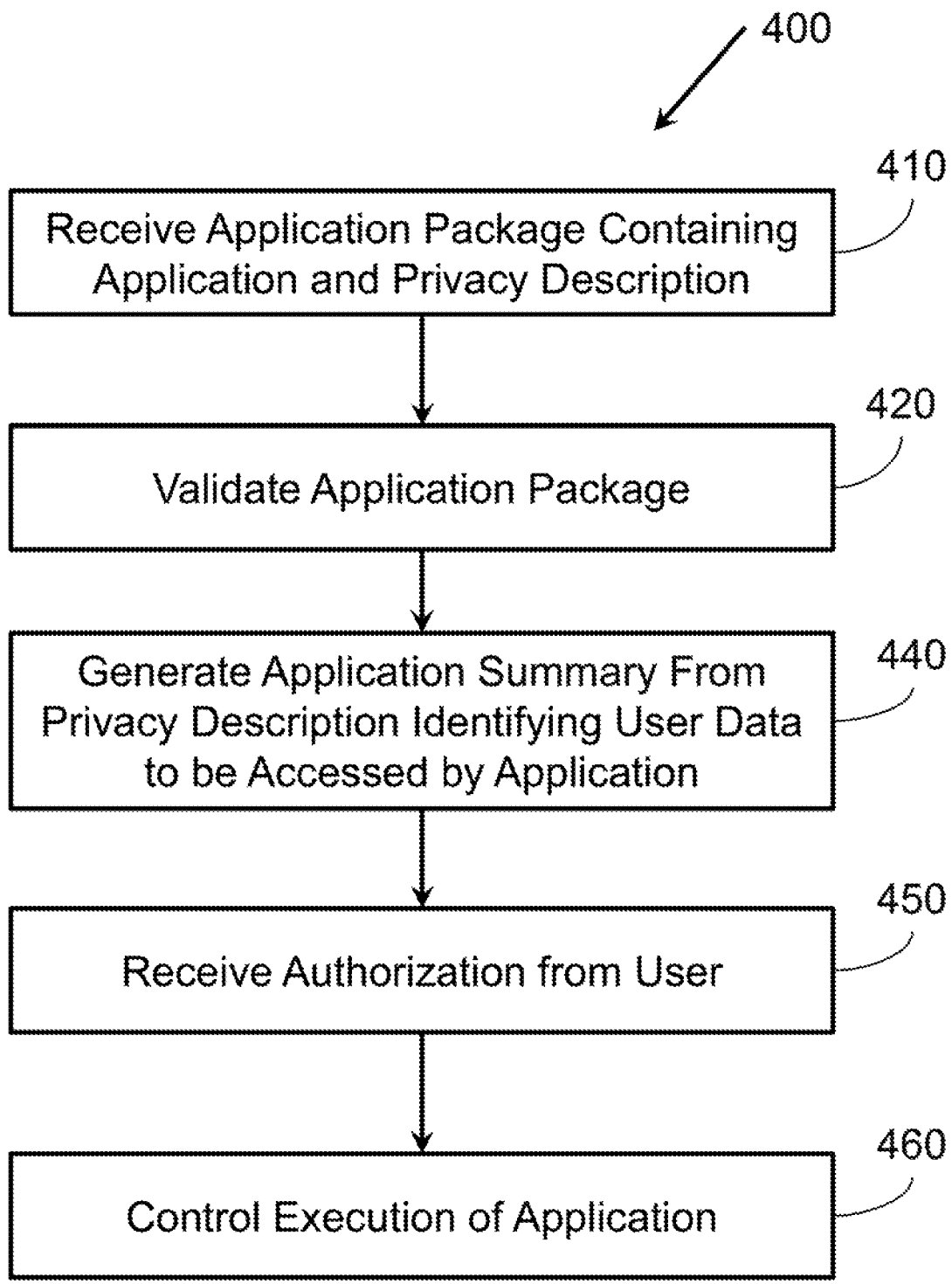
FIG. 4 illustrates a flowchart of example operations associated with application approval.

FIG. 4 illustrates an example method 400 associated with application approval. Method 400 may be embodied on a non-transitory processor-readable medium storing processor-executable instructions. The instructions, when executed by a processor, may cause the processor to perform method 400. In other examples, method 400 may exist within logic gates and/or RAM of an application specific integrated circuit (ASIC).

Method 400 includes receiving an application package at 410. The application package may contain an application from a service provider. The application package may also contain a privacy description for the application from a review provider. The application may operate on private data obtained from a set of devices. Members of the set of devices may be controlled by a user.

Method 400 also includes validating the application package at 420. Validating the application package may ensure components of the application package are properly credentialed. Validating the application package may rely on, for example, digital signatures associated with components of the application. Different components may be signed by different entities to prove to a user that the application will perform as described and not exceed a scope described.

Method 400 also includes generating an application summary at 440. The application summary may be generated from the privacy description. The application summary may be generated for the user. The application summary may describe what portions of the private data will be accessed by the application. The application summary may also describe how the portions of private data will be transmitted.

Method 400 also includes receiving an authorization at 450. The authorization may be received from the user. The authorization may indicate that the application is allowed to execute on data on the private. In some examples, the authorization from the user may identify specific private data approved for access by the application.

Method 400 also includes controlling execution of the application at 460. Execution of the application may be controlled based on the authorization from the user. In examples where the authorization from the user identifies specific private data approved for access by the application, controlling execution of the application may include preventing the application from accessing data outside the private data specified by the user as approved for access.

Figure 5:
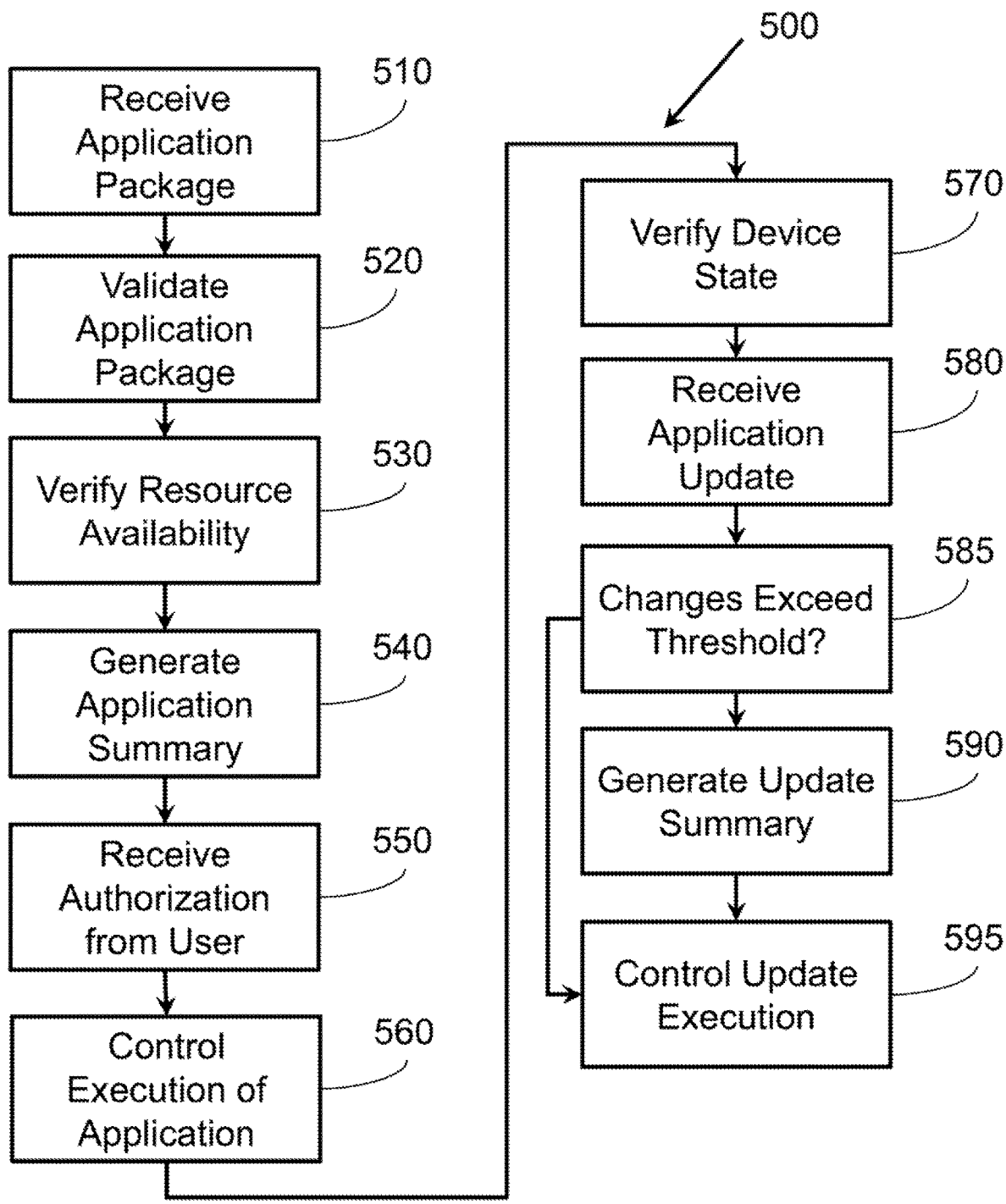
FIG. 5 illustrates another flowchart of example opera ions associated with application approval.

FIG. 5 illustrates a method 500 associated with application approval. Method 500 includes several actions similar to those described above with reference to method 400 (FIG. 4), For example, method 500 includes receiving an application package at 510, validating an application package at

520, generating an application summary at 540, receiving an authorization from a user at 550, and controlling execution of the application at 560.

Method 500 also includes verifying that resources are available for executing the application at 530, The resources may include processor availability, memory, and so forth. In some examples, the resource availability verification may be based on limitations imposed by the user regarding, for example, a time of day during which the application may be allowed to operate, and so forth. What resources will be used by the application may be specified by, for example, a component of the application package. If it is determined that resources that will be used by the application are unavailable (e.g., due to system limitations, due to other applications operating), this information may be reported to at least one of, the user, the service provider, the review provider, and so forth. Further, if resources for executing the application are unavailable, other actions associated with method 500 may not be performed because the application will not be able to run.

Method 500 also includes verifying a device state at 570. Here, a device state of a device performing method 500 may be verified. The device state may relate to, for example, resource availability of the device, components of the device, other devices connected to the device, a security state of the device, and so forth. The result of the verification may be reported to one or more of the user, the service provider, the review provider and so forth. Verifying the state of the device may facilitate, for example, preventing applications from running on an unsecured device. This may provide assurances to, for example, the service provider regarding the state of a device performing method 500. This may be desirable when the service provider wants to, for example, receive data promised in exchange for a benefit to the user that will be provided for executing the application.

Method 500 also includes receiving an update for the application and an update description at 580. The update for the application may be received from the service provider and the update description may be received from the review provider. Method 500 also includes determining whether the update description indicates the update changes the application in a manner exceeding a specified threshold at 585. When the changes do not exceed the specified threshold, method 500 may proceed to controlling execution of the update at action 595. Changes may not exceed the specified threshold when the changes do not affect what data will be accessed by the application. Validation of the update for the application, similar to the process performed for validation of the original application may also be performed (e.g., checking digital signatures and that components of the update have been received).

If the update will change the application in a manner exceeding the specified threshold, method 500 may proceed to generate an update summary at action 590. The update summary may be generated from the update description. The update summary may be provided to the user. The update summary may describe what portions of the private data will be accessed as a result of executing the update for the application. The update summary may also describe how the updated portions of the private data will be transmitted. If the user approves the changes, the user may provide an update authorization. Upon receiving the update authorization, method 500 may proceed to controlling execution of the update at 595. The execution of the update may be controlled based on an update authorization from the user.

Figure 6:
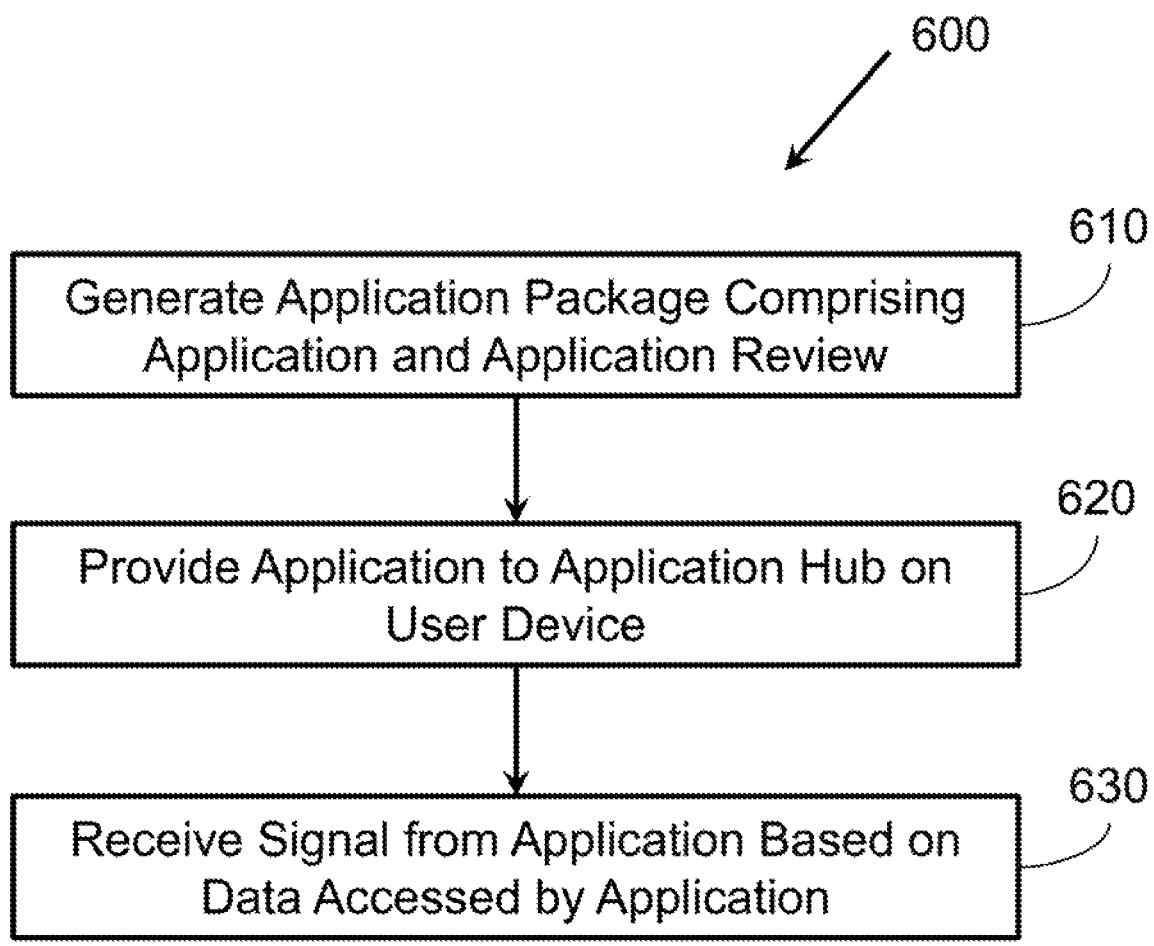
FIG. 6 illustrates flowchart of example operations associated with application approval.

FIG. 6 illustrates a method 600 associated with application approval. Method 600 includes generating an application package at 610. The application package may comprise an application generated by a service provider. The application package may also include a review of the application received from a review provider. The review of the application may specify privacy information that identifies data that will be accessed by the application. In some examples, method 600 may also include providing the application to the review provider (not illustrated). When providing the application to the review provider, a statement about data used by the application, how that data will be manipulated, and whether, how, and to who that data will be transmitted may also be provided. The review provider may then verify these statements, and provide the review for inclusion in the application package. The application package may also include, for example, verification information for the application, verification information for the review of the application, other details regarding the functionality of the application (e.g., resource consumption, user benefits), and so forth.

Method 600 also includes providing the application to an application hub at 620. The application hub may be on a device controlled by a user. The application hub may validate contents of the application package. The application hub may also provide the user a description of the application generated from the review of the application. The application hub may also seek approval to run the application from the user.

Method 600 also includes receiving a signal from the application at 630. The signal may contain information generated based on the data accessed by the application. Consequently, method 600 illustrates how a service provider may distribute their application to a user and receive information from the application.

Figure 7:
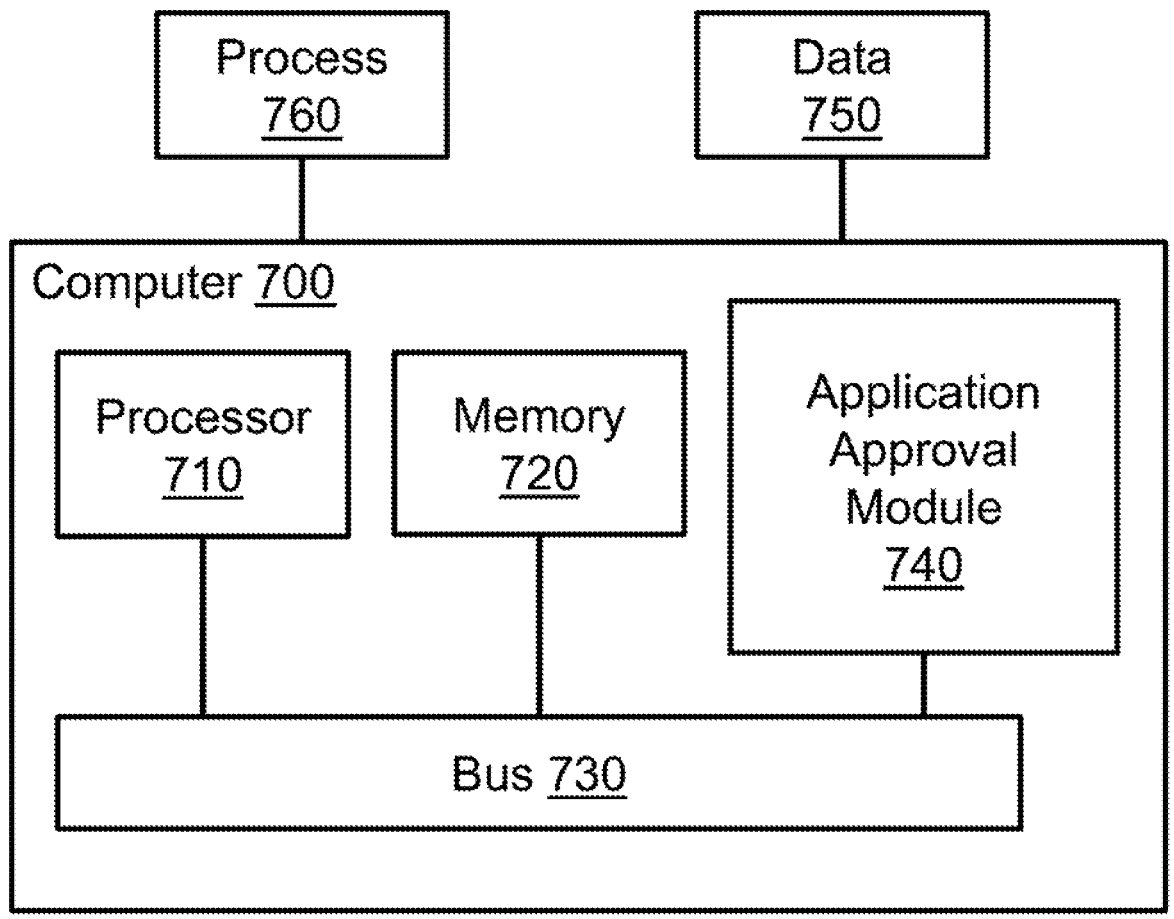
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes an application approval module 740. Application approval module 740 may perform, alone or in combination, various functions described above with reference to the example systems, methods, and so forth. In different examples, application approval module 740 may be implemented as a non-transitory computer-readable medium storing processor-executable instructions, in hardware, software, firmware, an application specific integrated circuit, and/or combinations thereof.

The instructions, may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
a processor; and
a non-transitory storage medium storing instructions executable on the processor to:
access a data store that stores data aggregated from a set of devices managed by a user;
receive an application package comprising an application generated by a service provider, and a review of the application from a review provider, the review identifying a recipient to which the application is to transmit data;
validate contents of the application package;
provide a description of the application to the user generated from the review of the application, wherein the description identifies data from the data store to be affected by running the application, and the description identifies the recipient; and
control execution of the application responsive to the user approving execution of the application based on the description.

2. The system of claim 1, wherein the application package comprises information indicating that the application is to access data of a first device of the set of devices, and
wherein the instructions are executable on the processor to control the application during the execution of the application to prevent the application from accessing data, in the data store, of a second device of the set of devices, the second device different from the first device.

3. The system of claim 1, wherein the instructions are executable on the processor to control access to data in the data store by the application based on the review.

4. The system of claim 3, wherein the instructions are executable on the processor to:
present a user interface to receive user-specified data, from the data store, that the application is allowed to access; and
control access to data in the data store by the application based on the user-specified data.

5. The system of claim 1, wherein the instructions are executable on the processor to:
receive an update package for the application, wherein the update package comprises update instructions for the application from the service provider, and a description of the update instructions from the review provider; and
prevent execution of the update instructions without user authorization responsive to the description of the update instructions indicating that the update instructions are to change functionality of the application by more than a specified threshold.

6. The system of claim 1, wherein the system is a device controlled by the user.

7. The system of claim 1, wherein the instructions are executable on the processor to provide information regarding a state of the system to at least one of the review provider or the service provider.

8. The system of claim 1, wherein the data store stores data aggregated from sets of devices managed by multiple users, and wherein the instructions are executable on the processor to control access to data in the data store by the application based on which users of the multiple users have approved execution of the application.

9. The system of claim 1, wherein the instructions are executable on the processor to control a member device of the set of devices to perform an action in response to at least one of: an instruction from the application, an instruction from the service provider, an instruction from the review provider, or an instruction from the application package.

10. The system of claim 1, wherein the review further comprises information regarding usage of a resource of the system by the application, and the description further comprises the information regarding the usage of the resource of the system by the application, and
wherein the instructions are executable on the processor to receive an approval, from the user, of the execution of the application, the approval based on the identified data, the identified recipient, and the information regarding the usage of the resource of the system by the application.

11. The system of claim 1, wherein the review further indicates that the application is to transmit data to a destination that is outside a control of the user, the destination being associated with the identified recipient, and the description further indicates that the application is to transmit data to the destination that is outside the control of the user, and
wherein the instructions are executable on the processor to receive an approval, from the user, of the execution of the application, the approval based on the identified data, the identified recipient, and the indication that the application is to transmit data to the destination that is outside the control of the user.

12. A method comprising:
receiving, by a computer, an application package containing an application from a service provider, and a privacy description for the application from a review provider, wherein the application is to operate on private data obtained from a set of devices controlled by a user, and wherein the privacy description indicates that the application is to access data associated with a first device of the set of devices;
validating, by the computer, the application package to ensure components of the application package are properly credentialed;
generating, by the computer from the privacy description, an application summary for the user, the application summary describing what portion of the private data is to be accessed by the application and how the portion of the private data is to be transmitted;
receiving, by the computer, an authorization from the user; and
controlling, by the computer, execution of the application based on the authorization from the user, wherein the controlling of the execution of the application comprises preventing the application from accessing data associated with a second device of the set of devices, the second device different from the first device.

13. The method of claim 12, wherein the authorization from the user identifies specific private data approved for access by the application, and wherein the controlling of the execution of the application comprises limiting access of the application to the specific private data.

14. The method of claim 12, comprising:
receiving, by the computer, an update for the application and an update description; and responsive to the update description indicating that the update changes the application in a manner exceeding a specified threshold:
  generating, from the update description, an update summary for the user, the update summary describing what updated portion of the private data is to be accessed as a result of executing the update and how the updated portion of the private data is to be transmitted;
  controlling execution of the update based on an update authorization from the user.

15. The method of claim 12, comprising verifying a state of the computer with at least one of the service provider or the review provider.

16. The method of claim 12, comprising verifying, by the computer, that resources are available for executing the application.

17. The method of claim 12, wherein the privacy description identifies a recipient to which the application is to transmit data, wherein the application summary identifies the recipient, and wherein the authorization from the user is based on the identified recipient.

18. The method of claim 17, wherein the privacy description further comprises information regarding usage of a resource of the computer by the application, and the application summary further comprises the information regarding the usage of the resource of the computer by the application, and
  wherein the authorization from the user is based on the portion of the private data to be accessed by the application, the identified recipient, and the information regarding the usage of the resource of the computer by the application.

19. The method of claim 17, wherein the privacy description further indicates that the application is to transmit data to a destination that is outside a control of the user, the destination being associated with the identified recipient, and the application summary further indicates that the application is to transmit data to the destination that is outside the control of the user, and
  wherein the authorization from the user is based on the portion of the private data to be accessed by the application, the identified recipient, and the indication that the application is to transmit data to the destination that is outside the control of the user.

20. A non-transitory storage medium comprising instructions that upon execution cause a computer to:
  generate an application package comprising an application from a service provider, and a review of the application from a review provider, where wherein the review specifies privacy information identifying data that is to be accessed by the application, and the review identifies a recipient to which the application is to transmit data;
  send the application package to an application hub on a device controlled by a user, the application hub to validate contents of the application package, provide the user a description of the application generated from the review of the application, and seek approval to run the application from the user, the description identifying the recipient;
  receive, from the application, a signal containing information generated based on the data accessed by the application.

* * * * *